Feb. 6, 1962     C. M. BOWERSOX     3,019,471
ZIPPER LUBRICATOR
Filed Jan. 14, 1959
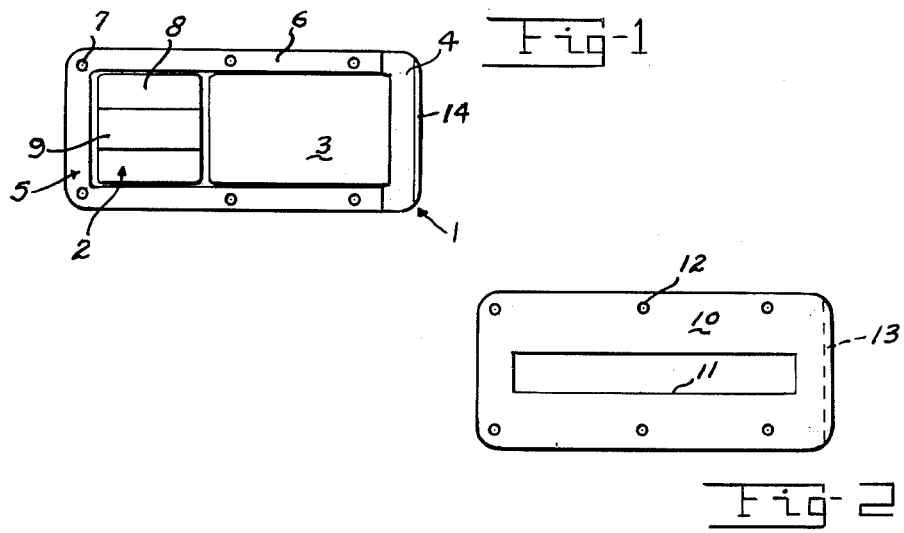
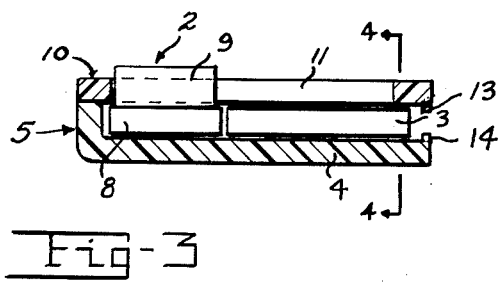
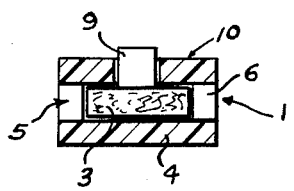
INVENTOR.
CHARLES M. BOWERSOX
BY
Jerome P. Bloom
ATTORNEY

3,019,471
ZIPPER LUBRICATOR
Charles M. Bowersox, 75 Cline St., Dayton, Ohio
Filed Jan. 14, 1959, Ser. No. 786,782
5 Claims. (Cl. 15—560)

This invention relates to a lubricating device and particularly provides a lubricator for slide or "zipper" type fasteners.

Slide fasteners such as "zippers" are prone to have functional difficulties after relatively short periods of use. This is generally due to lack of lubrication. Handling and exposure cause the original film of lubricant provided by the manufacturer to quickly dissipate. Also, chemicals used in cleaning garments will naturally dissolve any lubricant on a "zipper." This means that a "zipper" type fastener must be frequently lubricated to maintain it in a smooth operating condition. Failure to lubricate can result in jamming and breaking of the fastener.

As conventionally provided, "zipper" lubricants are sold in stick and jelly form. To properly lubricate a "zipper" they must be applied and spread with the fingers. Both the fingers and garments are stained in the process. These lubricants are not only messy to use but in a form that it is inadvisable to carry or store them on the person. Yet, most troubles with "zippers" occur away from home. This poses a problem. The problem that presents itself is how to provide a lubricating medium in a form that it can be safely carried on the person and can be applied to a "zipper" or the like without danger of staining the person or his garments. Efforts have been previously made to solve this problem by incorporating lubricant in an applicator. However, the applicator devices proposed have been generally unsatisfactory due to cost and complexity of structure. Moreover, methods of incorporating the lubricant have led to leaking of the lubricant and staining of garments.

The present invention provides a desirable solution to the above indicated problem. It affords a lubricator consisting of a simple carrier incorporating a wafer or plate of solid lubricant in a manner to provide an efficient and economical apparatus for lubricating "zippers" and the like. It can be easily used by a child without any danger of the child staining his fingers or his clothes. The lubricator is so designed that it can be safely carried on the person and the lubricant is so incorporated that it will not be inadvertently ejected from its carrier.

A primary object of the invention is to provide improvements in lubricating devices whereby they may be simply and economically fabricated, more efficient and satisfactory in use, adaptable to a wide variety of applications and simpler to operate.

Another object of the invention is to provide an improved lubricator device particularly applicable to slide or "zipper" type fasteners.

A further object of the invention is to provide a lubricator device for "zippers" and the like which can be carried on the person without danger of staining garments.

An additional object of the invention is to provide a novel "zipper" lubricator incorporating a solid wafer or plate of lubricant in such a manner it can be applied without staining the fingers or the garment in which the "zipper" is incorporated.

Another object of the invention is to provide a lubricator device obviating the problem of excessive application of lubricant in use.

A further object of the invention is to provide a simplified lubricator for "zippers" and the like incorporating a plate or wafer of lubricant which is shielded in use and so designed it cannot be projected inadvertently.

An additional object of the invention is to provide a lubricator device particularly applicable to slide type fasteners possessing the advantageous structural features, the inherent meritorious characteristics and the means and mode of operation herein described.

With the above primary and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein is illustrated a preferred but not necessarily the only form of embodiment of the invention, FIG. 1 shows a plan view of a "zipper" lubricator in accordance with the invention with its top plate removed for clarity of detail;

FIG. 2 is a plan view of the top plate for the device of FIG. 1;

FIG. 3 is a longitudinal sectional view of the "zipper" lubricator of FIGS. 1 and 2; and FIG. 4 is a view taken on line 4—4 of FIG. 3.

The invention can be best described with reference to the lubricator shown in the drawings. The device shown comprises a carrier housing 1 containing a slide operator 2 and a wafer or plate 3 of solid lubricant. There are no physical connecting means between these elements. The housing 1 is preferably formed of plastic and includes a base or bottom plate 4 which is generally rectangular in character. A generally U-shaped wall 5 projects vertically from the periphery of the plate 4. The base of the U extends across one end of the plate 4 while its equal leg portions 6 extend along opposite sides thereof to points short of its other end. The shape and extent of wall 5 can best be seen from FIG. 1 of the drawings. The wall 5 is so formed that its leg portions 6 are slightly convergent to their projecting extremities. Also, projecting vertically from the upper edge of the wall 5 are spaced locator pins 7.

The slide operator 2 is T-shaped and hollow. It is open at its top 8 which is disposed to abut the bottom plate 4 between the leg portions 6 of wall 5, adjacent their inner extremities. The stem portion 9 of slide operator 2 thus projects vertically relative plate 4 and beyond the limits of wall 5.

The wafer 3 of solid lubricant seats between the projecting extremities of leg portions 6 of wall 5 to extend from the slide operator 2 to slightly beyond the leg portions of wall 5. The wafer 3 has a longitudinal taper outwardly relative wall 5 conforming to the convergence of the projecting extremities of its leg portions 6. Thus, there is a restricting influence on wafer 3 due to the fact the distance between the projecting extremities of the leg portions 6 is less than at their inner ends.

A top plate 10 similar in outline to plate 4 is provided with a central longitudinal slot 11 and spaced apertures 12 corresponding in position to locator pins 7 on wall 5. The plate 10 seats to the upper edge of wall 5, receiving the locator pins through apertures 12 and is cemented thereto. In the process, the stem 9 of slide operator 2 projects through the slot 11 in the top plate 10. A pocket is thus established for the slide operator 2 and wafer 3 which has a restricted opening. The ends of plates 4 and 10 which project commonly beyond the projecting extremities of leg portions 6 of wall 5 have integral and opposite relatively spaced flange portions 13 and 14 respectively at the inner surfaces of their outermost extremities. These projecting ends shield the portion of wafer 3 which projects slightly beyond leg portions 6 and also define a guide channel adjacent thereto.

It may be readily seen that a "zipper" element or other slide element may be received within this guide channel to abut the slightly projecting edge portion of wafer 3 within the channel. The flanges 13 and 14 serve as tracks to couple the housing 1 to the "zipper" and guide its movement in the guide channel. A relative movement of the "zipper" transversely of wafer 3 through the guide channel will cause a thin film of lubricant to be transferred to the "zipper" alone within the guide channel. The fingers and garments of the person using the device are in no danger of staining due to the shielding influence of the flanged plates 4 and 10. When the projected portion of wafer 3 is used, the free slide operator 2 may be moved, as permitted by slot 11 in plate 10, to force a movement of wafer 3 slightly out of its pocket defined by leg portions 6 of wall 5. The taper on the wafer 3 confined by the convergence of the inner surface of leg portions 6 at the opening of its pocket prevents inadvertent discharge of the wafer 3 from housing 1 as do flanges 13 and 14. The use of a solid plate or wafer of lubricant insures there will be no undesirable spreading or leaking of the lubricant from its housing. The housing structure defining the pocket for wafer 3 is permanent and thus obviates any undesired handling of lubricant. The device as provided can be carried in a pocket and is so economical it can be thrown away when the lubricant is used up.

The simplicity of the invention embodiment and its use should be readily apparent. It is compact. The lubricant does not leak, break or smear as provided. Once the "zipper" element has had a film of lubricant applied as provided, an operation thereof will cause adequate spread of the film. There will be no stickiness or gumming. Maximum economy and efficiency results.

Of course, while a specific application and embodiment of the invention is shown, such is not to be construed as limiting since other applications and embodiments of the invention will be apparent therefrom and such is considered within the scope of the invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention I claim:

1. A device for lubricating slide fasteners and the like including a pair of plate-like housing sections in closely spaced generally parallel relation having a relatively shallow wall section forming a peripheral connection therebetween and defining a pocket therewith, the said wall section being interrupted and having its extremities defining an opening to said pocket, the said plate-like housing sections having portions projected relative the extremities of said shallow wall section, the extremities of said portions having opposed slide coupling means directed towards each other to overlap the opening to said pockets in spaced relation thereto, said pocket having a contour to house a wafer of lubricant, means in said pocket for engaging and projecting a portion of the wafer through said opening and means incorporated in a portion of said sections for limiting the projection of the wafer through said opening to establish its projected portion at a position spaced inwardly of said coupling means, said slide coupling means being operative to engage over a slide fastener and contain it to the projected portion of the wafer as it is moved thereby.

2. A device for lubricating slide fasteners and the like including a pair of plate-like housing sections in closely spaced generally parallel relation having a relatively shallow wall section forming a peripheral connection therebetween and defining a pocket therewith, the said wall section being interrupted and having its extremities defining an opening to said pocket, the said plate-like housing sections having portions projected relative the extremities of said shallow wall section, the extremities of said portions having opposed flange means directed toward each other to overlap the opening to said pocket in spaced relation thereto, said pocket having a contour to generally house a flat wafer of lubricant, means in said pocket for engaging and projecting a portion of the wafer through said opening and means incorporated in said shallow wall section for limiting the projection of the wafer through said opening to establish its projected portion at a position spaced inwardly of said flange means, said flange means being operative to engage over a slide fastener or the like and contain it to the projected portion of the wafer as it is moved thereby.

3. A device for lubricating slide fasteners and the like including a pair of plate-like housing sections in closely spaced generally parallel relation having a wall section forming a peripheral connection therebetween and defining a pocket therewith, said wall section being interrupted and having its extremities defining an opening to said pocket, the said plate-like housing sections having opposed slide coupling means integral therewith displaced outwardly relative the extremities of said wall section to overlap the opening to said pocket in spaced relation thereto, said pocket having a contour to house a wafer of lubricant, relatively free slide means in said pocket for engaging and projecting a portion of the wafer through said opening and means incorporated in a portion of said sections for limiting the projection of the wafer through said opening to establish its projected portion at a position spaced inwardly of said coupling means, said coupling means being operative to engage over a slide fastener and the like and contain it to the projected portion of the wafer as it is moved thereby.

4. A device for lubricating slide fasteners and the like comprising a housing including a pair of plate-like housing sections in closely spaced generally parallel relation having a shallow wall section forming a generally peripheral connection therebetween and defining a pocket therewith, said shallow wall section being interrupted and having its extremities defining an opening to said pocket, said housing having means projected from its opposed adjacent surfaces of its plate-like sections spaced beyond the extremities of its shallow wall section adapted to engage to a slide fastener or the like to establish it in predetermined relation to the opening to said pocket, said pocket being adapted to nest a wafer of lubricant, means in said pocket for applying a projecting force on the wafer and further means in said pocket for limiting the degree of projection of the wafer from said pocket to establish a predetermined spacing of its projected portion relative said fastener engaging means.

5. A device for lubricating slide fasteners or the like including a pair of plate-like housing sections having adjacent surfaces in closely spaced generally parallel relation and a wall section forming a generally peripheral connection therebetween and defining a pocket therewith, said wall section being interrupted and having its extremities defining an opening to said pocket, the pocket having a contour to house a relatively flat wafer of lubricant, relatively free means in said pocket to project the wafer therefrom, the extremities of said wall section having relatively convergent inner surfaces, said plate-like housing sections having portions projected beyond the extremities of said wall section including slide coupling means integral therewith adapted to engage over a slide fastener or the like and contain it to the projected portion of the wafer as it is moved thereby.

References Cited in the file of this patent

UNITED STATES PATENTS

| | | |
|---|---|---|
| 439,916 | Whittlesey | Nov. 4, 1890 |
| 978,410 | Sweet | Dec. 13, 1910 |
| 1,531,869 | Miele | Mar. 31, 1925 |
| 2,379,745 | Pischel et al. | July 3, 1945 |
| 2,395,709 | Anderson | Feb. 26, 1946 |
| 2,713,694 | Soldan | July 26, 1955 |

FOREIGN PATENTS

| | | |
|---|---|---|
| 254,912 | Great Britain | July 15, 1926 |